United States Patent Office 2,851,457
Patented Sept. 9, 1958

2,851,457

AMIDINOALKYLBENZOTHIAZINONES AND PROCESSES

Markus Zimmermann, Evanston, Ill., assignor to G. D. Searle & Co., Chicago, Ill., a corporation of Delaware No Drawing. Application April 9, 1956
Serial No. 576,782

10 Claims. (Cl. 260—243)

This invention relates to amidinoalkyl derivatives of 2H,1,4-benzothiazin-3(4H)-one and processes for the manufacture thereof. More particularly, this invention relates to amidinoalkyl derivatives as aforesaid, and having the formula

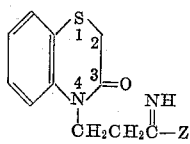

wherein Z represents either a nitrogen-containing heterocyclic radical or an amino radical optionally substituted by as many as two aliphatic or aralkyl radicals.

Among the nitrogenous heterocyclic radicals comprehended by Z in the foregoing structural formula are those defined by

where T is an alkylene radical containing more than three and less than eight carbon atoms, fewer than six of which are annularly disposed. It follows from this that

denotes a 5- or 6-membered heterocycle composed of methylene (—CH₂—) radicals and the single nitrogen atom shown, said heterocycle being optionally substituted by one or two alkyl groups aggregating not more than three carbon atoms. Illustrative of the cyclic amino radicals thus specified are pyrrolidinyl, 2-methylpyrrolidinyl, 2,5-dimethylpyrrolidinyl, 3-methyl-4-ethylpyrrolidinyl, piperidino, 3-methylpiperidino, and 2,6-dimethylpiperidino radicals.

Alternatively, Z in the generic formula in column 1 symbolizes polycyclic nitrogen-containing radicals such as those formed from indoline, isoindoline, tetrahydroquinoline, tetrahydroisoquinoline, and tetrahydro-β-carboline on removal of one atom of hydrogen, these radicals—like the monocyclic analogs thereof aforesaid—being substituted if and as desired by lower alkyl groups. Moreover, the alkylated nitrogen heterocycles of this invention, whether mono- or polycyclic, may carry hydroxyl radicals in each or some of the characteristic side-chains. Examples of hydroxylated amino radicals of the prescribed type are those which may be thought of as derived from 2-pyrrolidinemethanol, 4-piperidinepropanol, tetrahydro-4-quinolineethanol, and the like.

Still other radicals represented by Z in the column 1 formula are the unsubstituted amino radical itself, —NH₂, and the amino radical as modified by introduction of one or two alkyl groups—especially lower alkyl groups, for example, methyl, ethyl, propyl, isopropyl, butyl, isobutyl, secondary butyl, tertiary butyl, pentyl, secondary normal pentyl, primary isopentyl, secondary isopentyl, tertiary pentyl, and sundry hexyl groups. These alkyl groups—like those which constitute nuclear appendages in certain of the heterocyclic amino groups remarked above—may be substituted by hydroxyl radicals if desired. In selected instances, there may be a double bond present—as, for example, in the case of the diallylamino radical—or one of the hydrogen atoms of the alkyl group may be replaced by phenyl to yield a phenyl (lower alkyl) radical such as, for example, a benzyl- or phenethylamino radical. Where two alkyl groups are present, these may be descrete, as when Z designates a radical of the formula

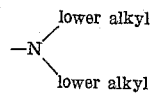

or, in the case of ethyl radicals, they may be joined together through oxygen or nitrogen to comprise morpholino or piperazino groupings

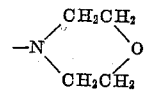

and

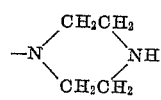

respectively. A lower alkyl radical, commonly methyl, may replace hydrogen on the secondary nitrogen atom of the piperazine moiety, ad libitum.

Equivalent to the basic amidines of this invention for the purposes here described are non-toxic acid-addition salts thereof, the composition of which may be symbolized by

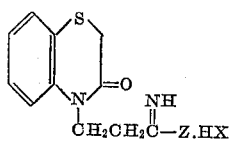

wherein Z has the meaning hereinbefore assigned and X is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, or the like—which, in combination withe the cationic portion of a salt aforesaid, is neither pharmacologically nor otherwise undesirable in pharmaceutical dosages.

The compounds to which this invention relates are useful because of their valuable pharmacological properties. For example, the subject compounds are hypotensive agents, being capable of reducing the elevated blood pressures characteristic of multiple disease states, and maintaining such reduction for substantial periods of time. Moreover, the compounds of the present discovery are anti-cholinergic agents. They have the property of blocking the transmission of nerve impulses across the autonomic ganglia, as well as inhibiting nerve-impulse transmission at the neuroeffector junctions of the parasympathetic and cerebrospinal nervous systems. Still a further aspect of the pharmacodynamics of the hereinafter claimed compounds is their ability to retard the growth of *Trichophyton mentagrophytes*—a property shared with other useful antifungal agents such as undecylenic acid.

The amidine bases which comprise this invention are relatively insoluble in water, but may be dissolved in dilute acids and such of the common organic solvents as alcohol, ethyl acetate, ether, and benzene. The acid-addition salts of this invention are, on the other hand, soluble in water and in aqueous solutions of alcohol or, for example, propylene glycol. The subject compounds may be administered in solid form as tablets or capsules; dissolved or suspended in aqueous media, they may be given parenterally.

The compounds of the present discovery may be manufactured as follows: 2H,1,4-benzothiazin-3(4H)-one—prepared by the procedure of A. W. Hofmann, Ber, 13, 1234 (1880)—is converted to the N-(β-cyanoethyl) derivative by condensation with acrylonitrile in the presence of a strong base—conveniently, 40% aqueous trimethylbenzylammonium hydroxide (which is marketed under the trade-name, Triton B). The cyanoethyl derivative, in turn, is subjected to alcoholysis by—for example—treatment at 0°±15° centigrade with ethanol, using hydrogen chloride as a condensing agent and an inert, organic solvent such as chloroform or tetrahydrofuran as the reaction medium. There is obtained by this means the corresponding imino ether hydrochloride, which, on simple contact with an appropriate amine, followed by alkalization, serves to produce a claimed amidine. Amination may be carried out in solvent medium if desired; and while such is not essential, it does appear to inhibit formation of extraneous by-products in some instances. A preferred solvent for this step in the manufacturing procedure is an anhydrous lower alcohol such as methanol or ethanol.

Conversion of the amidine bases of this invention to corresponding acid-addition salts is accomplished by mere admixture of these compounds with one equivalent of any of various inorganic and strong organic acids, the anionic portion of which conforms to X as hereinabove defined.

The following examples describe in detail certain of the compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.) and relative amounts of materials in parts by weight, except as otherwise noted.

EXAMPLE 1

A. *4-(2-cyanoethyl)-2H,1,4-benzothiazin-3(4H)-one.*— A mixture of 30 parts of 2H,1,4-benzothiazin-3(4H)-one, 24 parts of acrylonitrile, and 1 part of a 40% aqueous solution of trimethylbenzylammonium hydroxide is maintained with agitation at 30–40° C. for 3 hours. There is a moderate amount of heat evolved and occasional cooling is necessary to insure that the temperature of the reaction mixture remains within the desired range. Upon completion of the heating period, the reactants are diluted with aqueous ethanol; and the resultant precipitate is then filtered off and dried. The product thus obtained, 4-(2-cyanoethyl) - 2H,1,4-benzothiazin-3(4H)-one, melts at 104–107° C. and has the formula

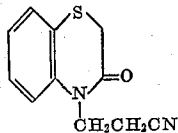

B. *4-(2-ethoxycarbiminoethyl) - 2H,1,4 - benzothiazin-3(4H)-one hydrochloride.*—To a solution of 24 parts of 4-(2-cyanoethyl)-2H,1,4-benzothiazin-3(4H)-one in 162 parts of dry chloroform is added 5 parts of absolute ethanol. The reactants are cooled to —10° C. and maintained at this temperature for 45 minutes while hydrogen chloride is bubbled therethrough. The reaction mixture is then stored for 48 hours at temperatures not higher than around 10° C., after which time—upon addition of anhydrous ether—an oily precipitate forms which slowly crystallizes on standing in the cold. Washing via decantation with repeated quantities of anhydrous ether facilitates the crystallization. The product is purified by trituration in ether, recovered on a filter, washed thereon with still further quantities of ether and dried over caustic soda. The 4 - (2 - ethoxycarbiminoethyl)-2H,1,4-benzothiazin-3(4H)-one hydrochloride which results melts at 109–111° C. and has the formula

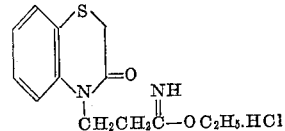

C. *4-(3-imino-3-piperidinopropyl)-2H,1,4-benzothiazin-3(4H)-one hydrochloride.*—To a solution of 9 parts of the imino ether hydrochloride of the preceding Part B of this example in 32 parts of anhydrous ethanol at substantially room temperatures is added 3 parts of piperidine. After 18 hours, there is precipitated from the reaction mixture 4-(3-imino-3-piperidinopropyl)-2H,1,4-benzothiazin-3(4H)-one hydrochloride. A quantity of ethyl acetate is introduced to insure the relatively complete insolubility of this product in the liquid phase. The material melts at 224–226° C. and recrystallization from a mixture of ethanol and ethyl acetate does not elevate this melting point. The product has the formula

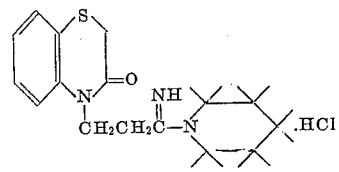

D. *4-(3-imino-3-piperidinopropyl)-2H,1,4-benzothiazin-3(4H)-one.*—An aqueous solution of the hydrochloride of the preceding Part C of this example, made alkaline with caustic soda, precipitates the corresponding base as an oil which is isolated by extraction into ether and subsequent evaporation of solvent.

EXAMPLE 2

*4-[3-imino-3-(N-pyrrolidinyl)propyl] - 2H,1,4-benzothiazin-3(4H)-one hydrochloride.*—To a solution of 8 parts of 4-(2-ethoxycarbiminoethyl)-2H,1,4-benzothiazin-3(4H)-one hydrochloride in 28 parts of absolute ethanol is added, at 15° C., 2 parts of pyrrolidine. After approximately 24 hours, 3 volumes of ethyl acetate is introduced into the reaction mixture. The precipitate which forms is recovered on a filter, washed thereon with ethyl acetate, and dried in air. The product thus obtained is 4-[3-imino-3-(N-pyrrolidinyl)propyl] - 2H,1,4-benzothiazin-3(4H)-one hydrochloride having the formula

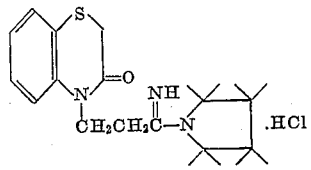

EXAMPLE 3

*4 - {3 - imino-3-[1-(3-oxopiperazinyl)]propyl}2H,1,4-benzothiazin-3(4H)-one hydrochloride.*—To a mixture of 30 parts of the imino ether hydrochloride of Example 1B with 120 parts of absolute ethanol is added 11 parts of 3-oxopiperazine, the reactants being sufficiently cooled to prevent a rise in temperature due to exothermic effects. After about 15 minutes, a precipitate begins to form in the previously substantially clear reaction mixture. The mixture is maintained overnight at room temperatures, then chilled to 5° C., and finally filtered. Recrystallization of the precipitate thus isolated from a mixture of aqueous ethanol and ethyl acetate affords 4-{3-imino-3-

[1 - (3 - oxopiperazinyl)]propyl} - 2H,1,4 - benzothiazin-3(4H)-one hydrochloride melting at 229–231° C. The product has the formula

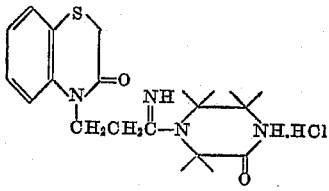

EXAMPLE 4

*4-[3-imino-3-(N-piperazinyl)propyl] - 2H,1,4 - benzothiazin-3(4H)-one dihydrochloride.*—A mixture consisting of 6 parts of the imino ether hydrochloride of Example 1B, 2 parts of piperazine, and 24 parts of absolute ethanol is allowed to stand at room temperatures overnight. The mixture is then chilled and a slight excess of hydrogen chloride dissolved in 2-propanol is introduced. The precipitate which forms is recovered on a filter, washed thereon with a little ethyl acetate, and dried in air. The product thus obtained is 4-[3-imino-3-(N-piperazinyl)propyl]-2H,1,4-benzothiazin-3(4H) - one dihydrochloride having the formula

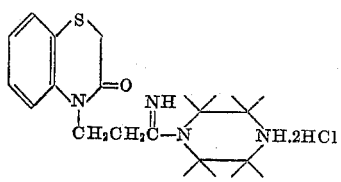

EXAMPLE 5

*4 - {3 - [N - (1,2,3,4-tetrahydroisoquinolyl)]-3-iminopropyl}-2H,1,4-benzothiazin-3(4H)-one hydrochloride.*— To a mixture of 21 parts of 4-(2-ethoxycarbiminoethyl)-2H,1,4-benzothiazin-3(4H)-one hydrochloride with 80 parts of absolute ethanol is added, at approximately 10° C. with agitation, 10 parts of 1,2,3,4-tetrahydroisoquinoline. Within about 10 minutes at room temperature, a clear solution results. Shortly thereafter, precipitation occurs to the extent that the reaction mixture becomes nearly solid. The mixture is allowed to stand at room temperatures overnight. Ethyl acetate is added to make a slurry, following which the solid product is filtered off and further purified by recrystallization from a mixture of aqueous ethanol and ethyl acetate. The 4-{3-[N-(1,2,3,4 - tetrahydroisoquinolyl)]3-iminopropyl} - 2H,1,4-benzothiazin-3(4H)-one hydrochloride thus obtained melts at 232–234° C. and has the formula

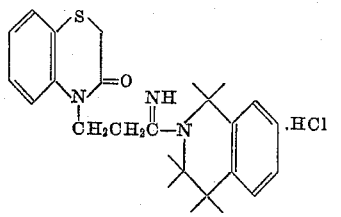

EXAMPLE 6

*4-{3-[N-(1,2,3,4 - tetrahydroquinolyl)]-3-iminopropyl}-2H,1,4 - benzothiazin-3(4H)-one hydrochloride.*—Upon substitution of 10 parts of 1,2,3,4-tetrahydroquinoline for the tetrahydroisoquinoline specified in the preceding Example 5, there is obtained, following the procedure detailed in Example 5, pure 4-{3-[N-(1,2,3,4-tetrahydroquinolyl)]3 - iminopropyl}-2H,1,4-benzothiazin - 3(4H)-one hydrochloride having the formula

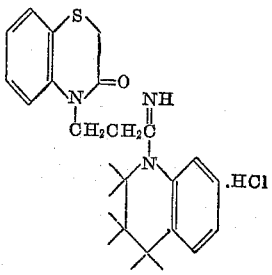

EXAMPLE 7

*4-{3-[2-(1,2,3,4 - tetrahydro-9H-pyrid[3,4-b]-indolyl)]-3 - aminopropyl}-2H,1,4-benzothiazin-3(4H)-one hydrochloride.*—A mixture of 7 parts of 4-(2-ethoxycarbiminoethyl - 2H,1,4 - benzothiazin-3(4H)-one hydrochloride— prepared by the procedure detailed in Example 1B—with 4 parts of 1,2,3,4-tetrahydro-9H-pyrid[3,4-b]indole in 29 parts of absolute ethanol is maintained with agitation in room temperatures for approximately 24 hours, following which the materials are allowed to stand quiescent for 60 hours. The solid phase is filtered from the reaction mixture and twice recrystallized from a mixture of aqueous ethanol and ethyl acetate. The material thus obtained is pure 4-{3-[2-(1,2,3,4-tetrahydro-9H-pyrid[3,4-b]indolyl)]-3-aminopropyl}-2H,1,4-benzothiazin-3(4H)-one hydrochloride, melting at 233–237° C., and having the formula

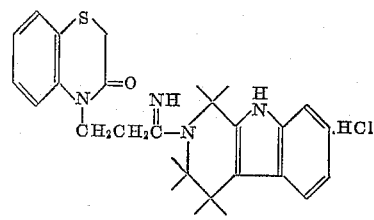

EXAMPLE 8

*4-(3-imino-3 - morpholinopropyl) - 2H,1,4 - benzothiazin-3(4H)-one hydrochloride.*—To 20 parts of the imino ether hydrochloride described in Part B of Example 1 suspended in 67 parts of ice-cold absolute ethanol is added 7 parts of morpholine. The suspension initially tends to clear almost to the point of solution; but after about 10 minutes, a substantial amount of precipitation takes place. The mixture is allowed to stand at room temperature overnight and the precipitate is recovered on a filter, washed thereon with ethyl acetate, and finally recrystallized from a mixture of aqueous ethanol and ethyl acetate to give pure 4-(3-imino-3-morpholinopropyl) - 2H,1,4 - benzothiazin - 3(4H)-one hydrochloride melting at approximately 238–241° C. (with decomposition). The product has the formula

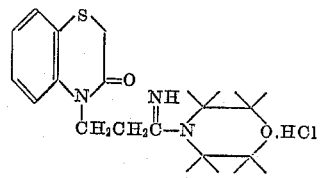

EXAMPLE 9

*4-(2-amidinoethyl) - 2H,1,4 - benzothiazin-3(4H) - one hydrochloride.*—To a suspension of 15 parts of the imino ether hydrochloride of Example 1B in 45 parts of cold absolute ethanol is added 1 part of ammonia dissolved in 7 parts of absolute ethanol. Upon agitation of the mixture at room temperatures, solution occurs. A crystalline precipitate subsequently forms while the reactants are maintained overnight at room temperatures. After chilling to around 5° C., the precipitate is filtered out and purified by recrystallization from a mixture of ethanol and ethyl acetate. The product thus obtained, 4-(2-amidinoethyl) - 2H,1,4 - benzothiazin - 3(4H) - one hydrochloride, melts at 184–185.5° C. and has the formula

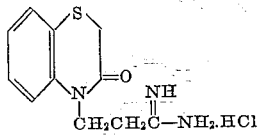

EXAMPLE 10

*4-[2-(N,N-diethylamidino)ethyl] - 2H,1,4 - benzothiazin-3(4H)-one hydrochloride.*—In accordance with the procedure described in the foregoing Example 9, interaction of 45 parts of the imino ether hydrochloride of Example 1B with 200 parts of absolute ethanol and 11 parts of diethylamine affords in good yield 4-[2-(N,N-diethylamidino)ethyl] - 2H,1,4 - benzothiazin - 3(4H) - one hydrochloride, having the formula

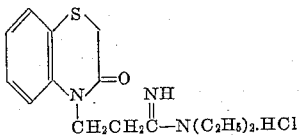

EXAMPLE 11

*4-{2-[N-(β-hydroxyethyl) - N - methylamidino]ethyl}-2H,1,4 - benzothiazin - 3(4H) - one hydrochloride.*—To a suspension of 11 parts of 4-(2-cyanoethyl)-2H,1,4-benzothiazin-3(4H)-one hydrochloride in 44 parts of absolute ethanol at approximately 10° C. is added 3 parts of N-methyl-β-hydroxyethyl amine. After a few moments, a clear solution results. The solution is allowed to stand at room temperatures overnight, following which ethyl acetate is introduced and the solution thereupon concentrated to the point of turbidity. On chilling to around 5° C., a substantial precipitate is thrown down. Recovered on a filter and subsequently recrystallized from a mixture of ethanol and ethyl acetate, the precipitated material melts at 144–145° C. This material is 4-{2-[N - (β - hydroxyethyl) - N - methylamidino]ethyl}-2H,1,4-benzothiazin-3(4H)-one hydrochloride, having the formula

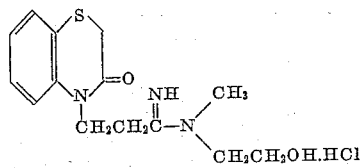

EXAMPLE 12

*4-[2-(N-phenethylamidino)ethyl]-2H,1,4-benzothiazin-3(4H)-one hydrochloride.*—To 6 parts of the imino ether hydrochloride of Example 1B above in 20 parts of cold dry ethanol is added 3 parts of phenethyl amine. A clear solution results within approximately 1 minute. The solution darkens on standing. Ethyl acetate is added to effect precipitation, the product thus thrown down being collected on a filter and purified by recrystallization from a mixture of aqueous ethanol and ethyl acetate. The 4-[2-(N-phenethylamidino)ethyl] - 2H,1,4 - benzothiazin-3(4H)-one hydrochloride so obtained melts at 144–148° C., with preliminary softening. The product has the formula

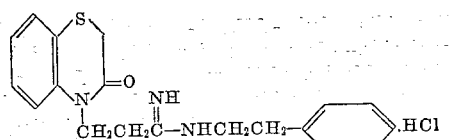

EXAMPLE 13

*4-[2-(N-benzylamidino)ethyl] - 2H,1,4 - benzothiazin-3(4H)-one hydrochloride.*—Substitution of 6 parts of benzyl amine for the phenethyl amine employed in the foregoing Example 12, and work-up in accordance with the procedure there detailed, affords pure 4-[2-(N-benzylamidino)ethyl]-2H,1,4 - benzothiazin - 3(4H)-one hydrochloride having the formula

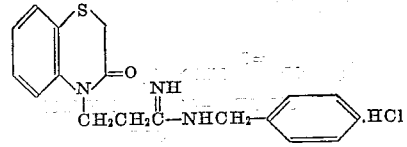

What is claimed is:

1. A compound of the formula

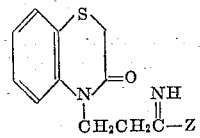

wherein Z is selected from the group consisting of pyrrolidinyl, piperidino, piperazinyl, oxopiperazinyl, tetrahydroquinolyl, tetrahydroisoquinolyl, tetrahydro - 9H-pyrid[3,4-b]-indolyl, and morpholino radicals; and radicals of the formula

wherein R' and R" are selected from the group consisting of hydrogen and lower alkyl, hydroxy(lower alkyl), and phenyl(lower alkyl) radicals.

2. A compound of the formula

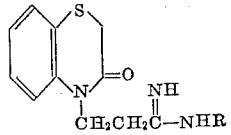

wherein R is a phenyl(lower alkyl) radical.

3. 4 - [2 - (N - phenethylamidino)ethyl] - 2H,1,4-benzothiazin-3(4H)-one.

4. A compound of the formula

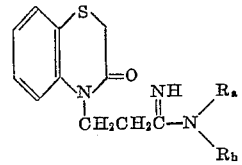

wherein R_a is a lower alkyl radical and R_h is a hydroxy(lower alkyl) radical.

5. 4 - {2 - [N - (β - hydroxyethyl)-N-methylamidino]-ethyl}-2H,1,4-benzothiazin-3(4H)-one.

6. 4 - (2 - amidinoethyl) - 2H,1,4 - benzothiazin-3(4H)-one.

7. 4 - {3 - [N - (1,2,3,4 - tetrahydroisoquinolyl)] - 3-iminopropyl}-2H,1,4-benzothiazin-3(4H)-one.

8. In a process for manufacturing compounds of the formula

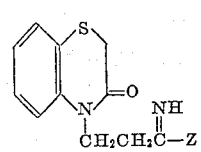

wherein Z is selected from the group consisting of pyrrolidinyl, piperidino, piperazinyl, oxopiperazinyl, tetrahydroquinolyl, tetrahydroisoquinolyl, tetrahydro-9H-pyrid[3,4-b]-indolyl, and morpholino radicals; and radicals of the formula

wherein R' and R" are selected from the group consisting of hydrogen and lower alkyl, hydroxy(lower alkyl), and phenyl(lower alkyl) radicals, the step which comprises contacting an imino ether hydrochloride of the formula

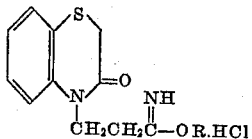

wherein R is a lower alkyl radical, with an amine of the formula

Z—H in which Z has the meaning hereinabove assigned.

9. In a process for manufacturing compounds of the formula

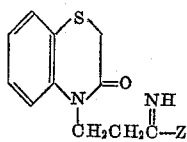

wherein Z is selected from the group consisting of pyrrolidinyl, piperidino, piperazinyl, oxopiperazinyl, tetrahydroquinolyl, tetrahydroisoquinolyl, tetrahydro - 9H-pyrid[3,4-b]-indolyl, and morpholino radicals; and radicals of the formula

wherein R' and R" are selected from the group consisting of hydrogen and lower alkyl, hydroxy(lower alkyl), phenyl(lower alkyl) radicals, the step which comprises contacting 4-(2-ethoxycarbiminoethyl)-2H,1,4-benzothiazin-3(4H)-one hydrochloride with an amine of the formula

Z—H wherein Z has the meaning hereinabove assigned, using an anhydrous lower alcohol as a solvent.

10. 4 - (3 - imino - 3 - piperidinopropyl) - 2H,1,4-benzothiazin-3(4H)-one.

References Cited in the file of this patent
UNITED STATES PATENTS

| | | |
|---|---|---|
| 2,676,968 | Burtner | Apr. 27, 1954 |
| 2,799,619 | Seifter | July 16, 1957 |